(12) United States Patent
Reneau et al.

(10) Patent No.: US 7,362,383 B2
(45) Date of Patent: Apr. 22, 2008

(54) SYSTEM, METHOD AND APPARATUS FOR UTILIZING A SINGLE VIDEO INPUT OF AN ELECTRONIC AUDIO/VISUAL SIGNAL RECEIVER AS AN INPUT FOR MULTIPLE VIDEO SIGNAL FORMATS

(75) Inventors: Daniel Lee Reneau, Fishers, IN (US); Thomas Dale Yost, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 591 days.

(21) Appl. No.: 09/944,460

(22) Filed: Aug. 31, 2001

(65) Prior Publication Data

US 2003/0043295 A1     Mar. 6, 2003

(51) Int. Cl.
*H04N 5/268* (2006.01)
(52) U.S. Cl. ............... 348/706; 348/554; 348/708
(58) Field of Classification Search ............... 348/554, 348/555, 558, 661, 713, 441, 708, 705, 706, 348/445; 345/604, 603; *H04N 5/46, 9/64*
See application file for complete search history.

(56) References Cited

U.S. PATENT DOCUMENTS

| | | | |
|---|---|---|---|
| 4,743,958 A | 5/1988 | Bannister et al. | |
| 4,994,914 A | 2/1991 | Wiseman et al. | |
| 5,132,793 A | 7/1992 | Hirahata et al. | |
| 5,784,113 A | 7/1998 | Rhodes | |
| 5,796,442 A * | 8/1998 | Gove et al. | 348/556 |
| 6,104,437 A * | 8/2000 | Taira et al. | 348/563 |
| 6,177,946 B1 * | 1/2001 | Sinclair et al. | 345/501 |
| 6,229,574 B1 * | 5/2001 | Han | 348/555 |
| 6,577,349 B1 * | 6/2003 | Yamaguchi et al. | 348/556 |
| 6,621,526 B1 * | 9/2003 | Yamagishi | 348/659 |
| 6,690,425 B1 * | 2/2004 | Worrell | 348/445 |
| 6,697,110 B1 * | 2/2004 | Jaspers et al. | 348/272 |

* cited by examiner

*Primary Examiner*—Trang U. Tran
(74) *Attorney, Agent, or Firm*—Joseph J. Laks; Robert D. Shedd; Reitseng Lin

(57) ABSTRACT

A system, method, and apparatus for utilizing a single video input for receiving multiple video format signals in an electronic video receiver. The single video input includes a set of inputs to accommodate a component video signal from any one of a multitude of video components that output video signals in component video format. An input video signal in one of several component video formats provided to the single video input is selected and processed according to its video format. Once processed, the selected input video signal is output as an output video signal of a particular video format. The particular video format is compatible with a video format utilized by an external component.

20 Claims, 8 Drawing Sheets

SYSTEM, METHOD AND APPARATUS FOR UTILIZING A SINGLE VIDEO INPUT OF AN ELECTRONIC AUDIO/VISUAL SIGNAL RECEIVER AS AN INPUT FOR MULTIPLE VIDEO SIGNAL FORMATS

BACKGROUND

1. Field of the Invention

The present invention relates to electronic audio/visual signal receivers capable of processing multiple video signal formats and, more particularly, to an audio/visual signal receiver capable of processing multiple video signal formats and having a video input operative to receive multiple video signal formats.

2. Background Information

Electronic audio/visual signal receivers of today, such as monitors, televisions, or television signal receivers, are capable of receiving and processing either a VGA-type signal from a computer so that the audio/visual signal receivers can be used as a computer monitor, or a digital television signal (a DTV signal such as and encompassing standard definition television, SDTV, or high definition television, HDTV) so that the audio/visual signal receivers can be used as a television.

A typical VGA-type signal is an RGB signal from a computer or multi-sync component. The RGB signal comprises a component video signal in an RGB color space. A DTV-type signal usually comprises a YUV component video signal in a YUV color space. While the two video signal formats are both component video formats, the two component video signal formats are not compatible.

YUV formats fall into two distinct groups namely, a packed format and a planar format. The packed format is where Y, U, and V samples are packed together into macropixels that are stored in a single array. The planar format is where each component is stored as a separate array, the final image being a fusing of the three separate planes.

In both YUV formats, however, Y is the luminance signal, while U and V are the chrominance (color) signals or color difference signals. U and V are constructed by extracting the luminance signal alternatively from the color signals (Red and Blue). The U color-difference signal is Blue minus Y and the V is Red minus Y. The luminance image (Y) will usually be transmitted 25 to 30 times per second. The two color difference signals are transmitted with one-half the bandwidth but are still transmitted at 25 to 30 times per second. YUV, is known as YPbPr, Y/R−Y/B−Y, YCrCb, YPrPb, is thus a digital television signal color space format for digital television signals. The YUV system is also known as "equiband" or Y, R−Y, B−Y.

Both the RGB format and the YUV format thus require three separate cables or conductor for transmitting the video information with one more cable or conductor for audio information.

In some cases, these electronic audio/visual signal receivers are capable of receiving and processing multiple video signal formats or both RGB and YUV format video signals. The audio/visual signal receivers however, must have multiple video inputs, one for each video format (i.e. one for RGB and one for YUV). Currently, a single component video input cannot accommodate multiple component video formats.

SUMMARY

The subject invention is a system, method, and apparatus for utilizing a single video input for receiving multiple video format signals in a video receiver. Particularly, the single video input includes a set of inputs to accommodate a component video signal from any one of a multitude of video components. An input video signal in one of several component video formats is selected and processed according to its video format. Once processed, the selected input video signal is output as an output video signal of a particular video format. The particular video format is compatible with a video format utilized by an external component.

In accordance with an aspect of the subject invention, there is provided in a video signal receiver having a component video signal input, a method of processing an input video signal. The method includes the steps of (a) receiving a video signal via the component video signal input, the received video signal having a video format that is one of multiple video formats, (b) converting the video format of the received video signal to a particular video format if the video format of the received video signal is different than the particular video format; and (c) providing one of the converted video signal and the received video signal as an output.

In accordance with another aspect of the subject invention, there is provided a video signal receiver. The video signal receiver includes a component video format input, a video processor in communication with the component video format input, a format converter in communication with the video processor, and a component video format output in communication with the video processor and the format converter. The component video format input is operative to receive a component video signal in one of various video formats. The video processor is operative to provide video processing of the received component video signal. The format converter is operative to convert the video format of the received video signal to a predetermined video format if the video format of the received video signal is different than the predetermined video format, while the component video format output is operative to selectively output one of the received component video signal and the converted video signal.

In accordance with yet another aspect of the subject invention, there is provided a video signal receiver. The video signal receiver includes a component video input operative to receive a video signal in one of multiple video formats. Means are provided for processing the received video signal. Means for converting the video format of the received video signal into a predetermined video format if the video format of the received video signal is different than the predetermined video format are also provided. The video signal receiver further includes means for providing one of the processed received video signal and the converted video signal to an output of the video signal receiver.

BRIEF DESCRIPTION OF THE DRAWINGS

The above-mentioned and other features and advantages of this invention, and the manner of attaining them, will become more apparent and the invention will be better understood by reference to the following description of embodiment(s) of the invention taken in conjunction with the accompanying drawings, wherein.

Corresponding reference characters indicate corresponding parts throughout the drawings.

DESCRIPTION OF THE PREFERRED EMBODIMENT

Figure 1:
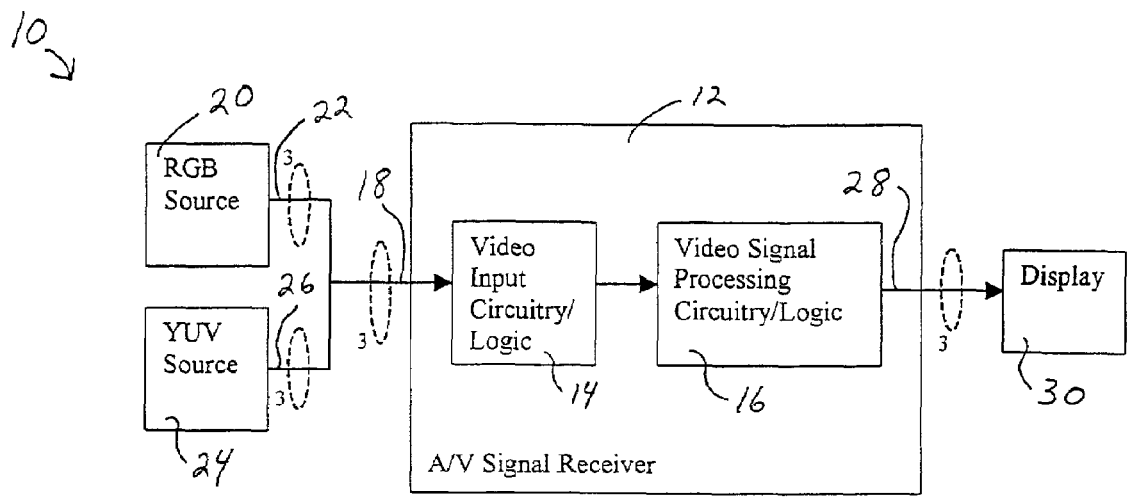
FIG. 1 is a block diagram of an exemplary audio/video system according to the principles of the subject invention.

Referring to FIG. 1, there is shown an audio/video (A/V) system, generally designated 10. The A/V system 10 includes an audio/video (A/V) signal receiver 12 and a display 30. The A/V signal receiver 12 includes video input circuitry/logic 14 that is adapted to receive a video signal from a single video input 18. The video input 18 is a component video input and thus is comprised of three conductors, represented by the dashed oval with the number "3." The video input circuitry/logic 14 is operative to receive three components of the input video signal. The video input circuitry/logic 14 is in communication with video signal processing circuitry/logic 16. The video signal processing circuitry/logic 16 is operative to process the video output signal from the video input circuitry/logic 14 and provide a video output on a video output line 28. The video output line 28 is comprised of three-conductors for the output component video. The output component video on the video output line 28 is provided to a video format compatible display 30. The display 30 may be internal or external to the A/V signal receiver 12.

The video input 18 is connectable to an RGB signal source 20 (a component video format) via a three-conductor output 22 thereof, and a YUV signal source 24 (another component video format) via a three-conductor output 26 thereof. The RGB source 20 is representative of any RGB signal source such as a computer, a multi-sync component, a set-top box (STB), or the like. The YUV source 24 is representative of any YUV signal source such as a DVD player, a digital television (DTV) signal receiver such as a satellite receiver, digital cable (including a digital cable converter or set top box), or any other 2.xxH component.

While both the RGB source 20 and the YUV source 24 are shown coupled to the video input 18, the video input 18 can only support connection with one of the RGB source 20 and the YUV source 24. However, in accordance with an aspect of the subject invention, the A/V signal receiver 12 is operative to accept either video signal format (RGB or YUV) from the single video input 18.

The video signal processing circuitry/logic 16 is operative to process either one of the video signals from the RGB source 20 (which is an RGB format video signal) and the YUV source 24 (which is a YUV format video signal). The video signal processing circuitry/logic 16 outputs a video format signal that is compatible with the video format of the display 30. This is typically the YUV video format. The video signal processing circuitry/logic 16 is further operative to determine the video format of the video signal from the video input circuitry/logic 14. If the video format of the video signal from the video input circuitry/logic 14 is compatible with the video format of the display 30, minor processing of the received video signal may be accomplished by the video signal processing circuitry/logic 16 before being output to the display 30. If the video format of the video signal from the video input circuitry/logic 14 is not compatible with the video format of the display 30, the received video signal is converted into the video format of the display 30.

As an example of the above, assume that the video format of the display 30 is YUV. When a YUV video signal source 24 is provided to the input 18, the video signal processing circuitry/logic 16, after determining that the input signal is in the YUV video format, performs minor signal processing before being output to the display 30 via the output 28. When an RGB video signal source 20 is provided to the input 18, the video signal processing circuitry/logic 16, after determining that the input signal is in the RGB video format, performs format conversion processing before being output to the display 30 via the output 28. More particularly, the RGB video format is converted to the YUV video format before being transmitted to the display 30. Of course, it should be appreciated that if the video format of the display 30 were RGB, the video signal processing circuitry/logic 16 would pass RGB video format signals (with minor processing thereof) and convert YUV video format signals into the RGB video format. It should also be appreciated that the component video inputs may be different than RGB or YUV. The above description would change accordingly.

Thus, in summary, the A/V signal receiver 12 is operative to accept an RGB video signal from an RGB signal source 20 or a YUV video signal from a YUV signal source 24 via a single video input of the A/V signal receiver 12 and output a single video format signal. Stated in broader terms, the A/V signal receiver 12 is operative to accept multiple video signals from one or more video signal sources via a single video input of the A/V signal receiver 12 and output a single video format signal. The single video format signal is typically transmitted to the display 30, but may be used elsewhere by the A/V system 10 and/or the A/V signal receiver 12.

Figure 2:
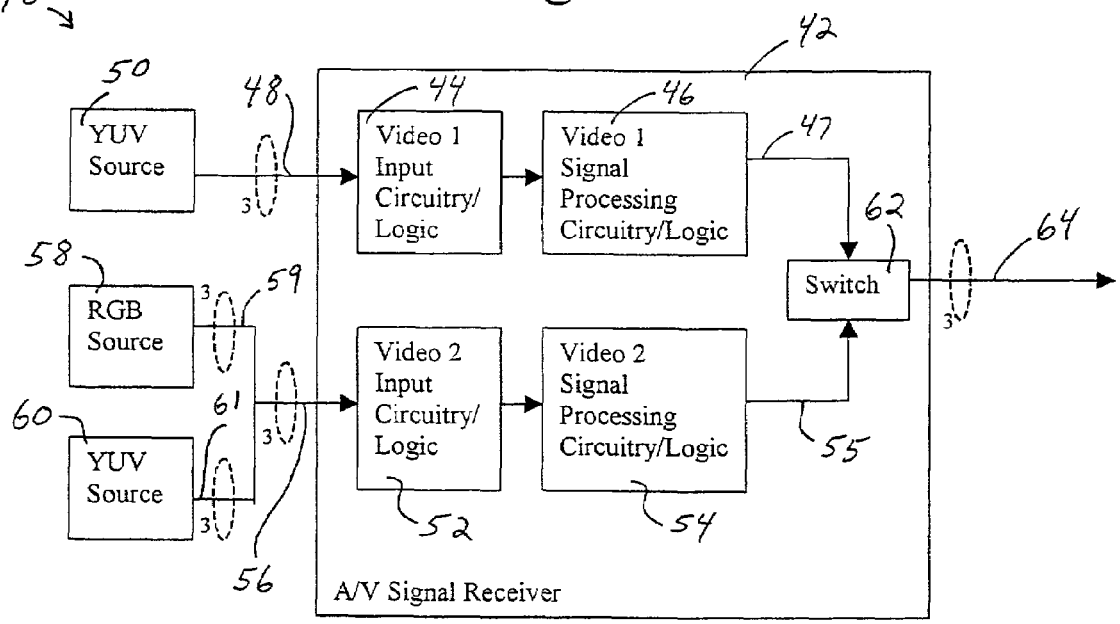
FIG. 2 is a block diagram of another exemplary audio/video system according to the principles of the subject invention.

Referring to FIG. 2, there is depicted another embodiment of an audio/video (A/V) system, generally designated 40. The A/V system 40 includes an audio/video (A/V) signal receiver 42. The A/V signal receiver 42 has first video input circuitry/logic 44 that is adapted to receive a video signal from a first video input 48. The first video input 48 is a component video input and thus is comprised of three conductors, represented by the dashed oval with the number "3." Preferably, a YUV component video format signal source 50 is coupled to the first video input 48. The first video input circuitry/logic 44 is operative to receive three components of the input video signal. The first video input circuitry/logic 44 is in communication with first video signal processing circuitry/logic 46. The first video signal processing circuitry/logic 46 is operative to process the first video output signal from the first video input circuitry/logic 44 and provide a first video output on a first video output line 47. The first video output line 47 is coupled to one input of a switch 62.

The A/V signal receiver 42 has second video input circuitry/logic 52 that is adapted to receive a video signal from a second video input 56. The second video input 56 is a component video input and thus is comprised of three conductors, represented by the dashed oval with the number "3." In accordance with an aspect of the subject invention, either an RGB component video format signal source 58 or a YUV component video format signal source 60 is coupled to the second video input 56. The RGB source 58 is coupled to the second video input 56 via a three-conductor cable 59, when provided. Likewise, the YUV source 60 is coupled to the second video input 56 via a three-conductor cable 61, when provided.

The second video input circuitry/logic 52 is operative to receive three components of the input video signal regardless of the video format. The second video input circuitry/logic 52 is in communication with second video signal processing circuitry/logic 54. The second video signal processing circuitry/logic 54 is operative to process the second video output signal from the second video input circuitry/logic 52 and provide a second video output on a second video output line 55. The second video output line 55 is coupled to another input of the switch 62.

The switch 62 is operative to allow one of the two output video signals (output Video 1 from the first video signal processing circuitry/logic 46 or output Video 2 from the second video signal processing circuitry/logic 54) to output thereby. An output of the switch is provided as a component video output 64. The component video output 64 is in a format compatible with whatever component (not shown) is coupled thereto. Thus, the A/V signal receiver 42 has two video inputs for the coupling thereof of two external video signal sources. The A/V signal receiver 42 is operative to supply either one of the first and second video signals (from the video 1 signal processing circuitry/logic 46 and the video 2 signal processing circuitry/logic 54) to a coupled component.

It should be understood, that while both the RGB source 58 and the YUV source 60 are shown coupled to the second video input 56, the second video input 56 can only support connection with one of the RGB source 58 and the YUV source 60. However, in accordance with an aspect of the subject invention, the A/V signal receiver 42 is operative to accept either video signal format (RGB or YUV) from the single, second video input 56.

The second video signal processing circuitry/logic 54 is operative to process either one of the video signals from the RGB source 58 (which is an RGB format video signal) and the YUV source 60 (which is a YUV format video signal). The second video signal processing circuitry/logic 54 outputs a video format signal that is compatible with the video format of the component coupled thereto (not shown). This is typically a display and/or display circuitry/logic that utilizes the YUV video format. The second video signal processing circuitry/logic 54 is further operative to determine the video format of the second video signal from the second video input circuitry/logic 52. If the video format of the second video signal from the second video input circuitry/logic 52 is compatible with the video format of coupled component, minor processing of the received second video signal may be accomplished by the second video signal processing circuitry/logic 54 before being output to the switch 62. If the video format of the second video signal from the second video input circuitry/logic 54 is not compatible with the video format of the coupled component, the received second video signal is converted into the video format of the coupled component.

As an example of the above, assume that the coupled component is a display that utilizes the YUV video format. When a YUV video signal source 60 is provided to the second input 56, the second video signal processing circuitry/logic 52, after determining that the second input signal is in the YUV video format, performs minor signal processing before being output to the switch 62 via second signal output 55. When an RGB video signal source 58 is provided to the second input 56, the second video signal processing circuitry/logic 54, after determining that the input signal is in the RGB video format, performs format conversion processing before being output to the switch 62 via the second signal output 55. More particularly, the RGB video format is converted to the YUV video format before being transmitted to the switch 62. Of course, it should be appreciated that if the video format of the display were RGB, the second video signal processing circuitry/logic 54 would pass RGB video format signals (with minor processing thereof) and convert YUV video format signals into the RGB video format. It should also be appreciated that the component video inputs may be different than RGB or YUV. The above description would change accordingly.

Thus, in summary, the A/V signal receiver 42 is operative to accept a YUV video signal from a YUV signal source 50 via the first video input 48, and an RGB video signal from an RGB signal source 58 or a YUV video signal from a YUV signal source 60 via a second, single video input 56 and output any one of the three video signals in one video format signal. Stated in broader terms, the A/V signal receiver 42 has two video inputs, wherein one video input (input 56) is operative to accept multiple video signals from one or more video signal sources and output a single video format signal if selected by the switch 62.

It should be appreciated that the switch 62 is operative to select which one of the first video signal and the second video signal is output to the video output 64. If the switch 62 of the A/V signal receiver 42 is set to provide the first video signal from the output 47, the second video signal processing circuitry/logic 54 may not process any signals. If the switch 62 is set to provide the second video signal from the output 55, the second video signal processing circuitry/logic 54 is active.

Figure 3:
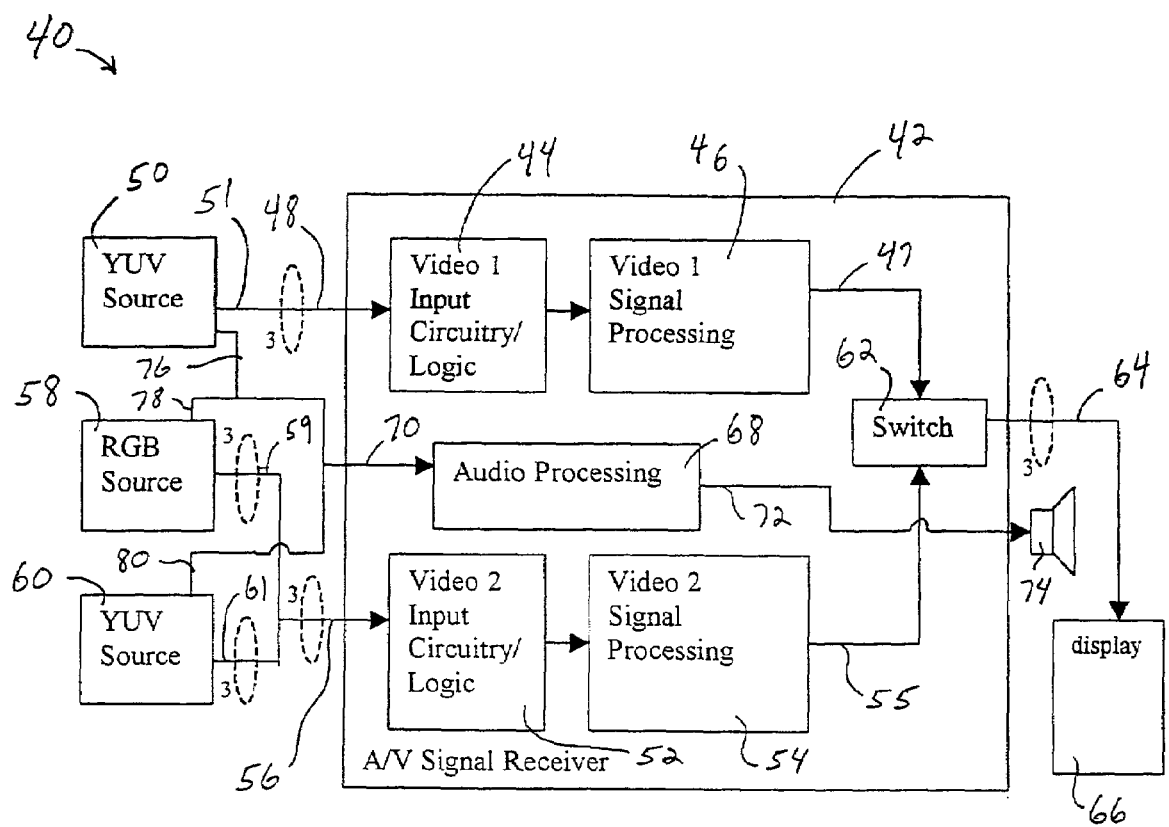
FIG. 3 is a block diagram of another exemplary audio/video system according to the principles of the subject invention.

Referring to FIG. 3, the A/V system 40 is depicted having various modifications thereto. In particular, the A/V signal receiver 42 includes an audio processor 68 for audio processing from the various video signals. More particularly, the YUV signal source 50 includes an audio line 76 that is coupled to an audio input 70. The audio input 70 is in communication with the audio processor 68. The RGB signal source 58 includes an audio line 78 that is couplable to the audio input 70 (when present), while the YUV signal source 60 likewise includes an audio line 80 that is couplable to the audio input 70 (when present). The audio processor 68 obtains the audio from the respective audio signal and provides the processed audio to a speaker 74 (or speakers) via an audio output line 72. The speaker(s) 74 may be external or internal to the A/V signal receiver 42.

The video output 64 of the A/V signal receiver 42 is transmitted to a display 66. While the display 66 is shown as being external to the A/V signal receiver 42, the display 66 may be integral with or internal to the A/V signal receiver 42. The display 66 is also preferably compatible with the YUV video format. However, other video format displays may be used.

Figure 4:
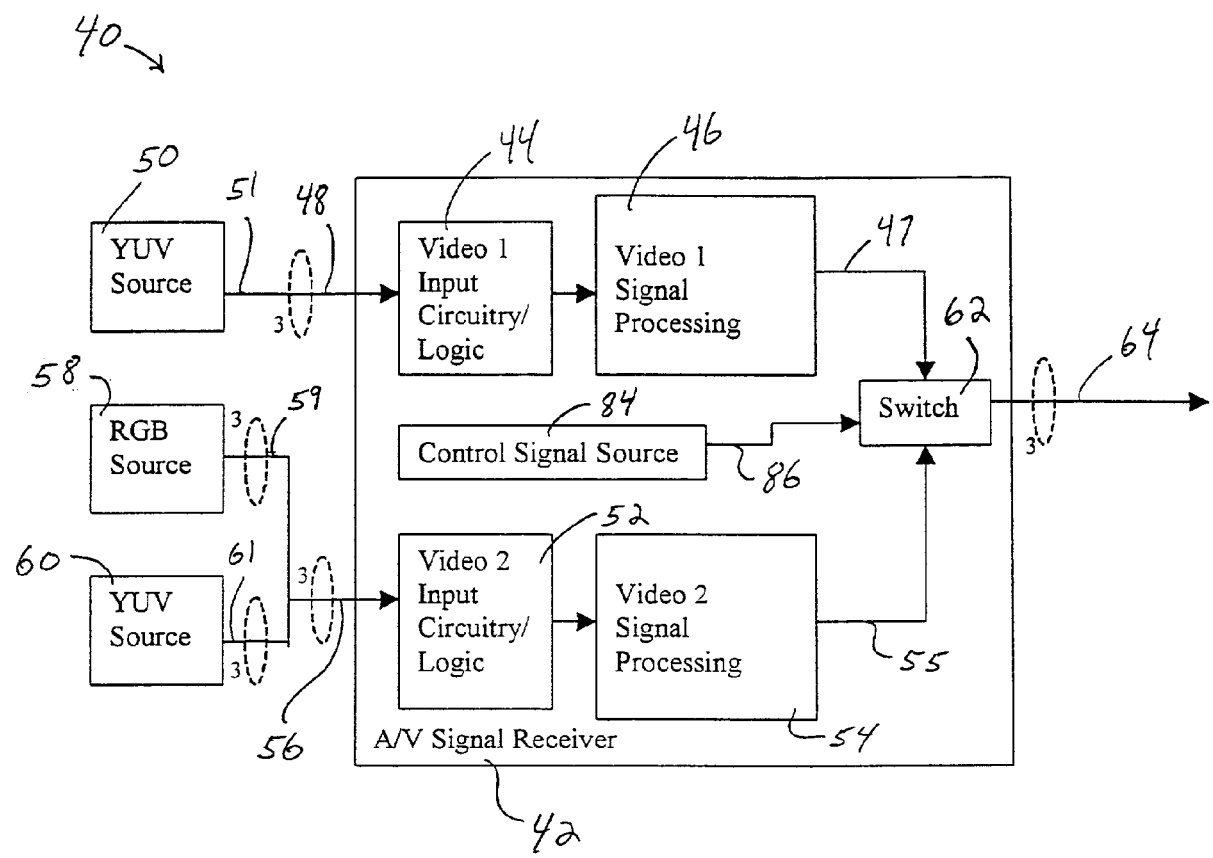
FIG. 4 is a block diagram of another exemplary audio/video system according to the principles of the subject invention.

Referring now to FIG. 4, the A/V system 40 is depicted having various modifications thereto. In particular, the A/V signal receiver 42 includes a control signal source 84 that is in communication with the switch 62 via a control line 86. The control signal source 84 is operative to provide a control signal or control signals via the control line 86 to the switch 62 in order to select which video signal to output to the video output 64. The switch 62 is thus operative to the control signal(s) to select one of the two video inputs (first video line 47 or second video line 55). The control signal source 84 may itself be controlled by a user via a user interface (not shown) to the A/V signal receiver. The user interface may include a remote control system (not shown) that includes a video source selection.

Figure 5:
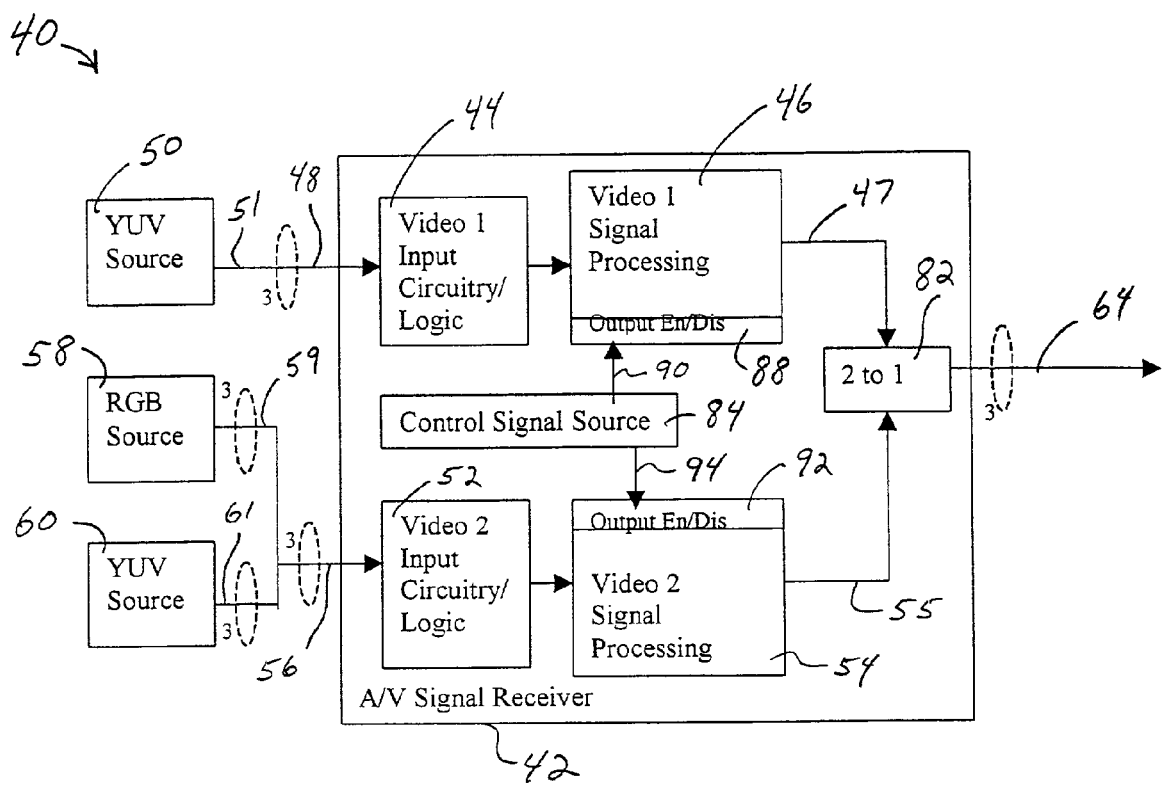
FIG. 5 is a block diagram of another exemplary audio/video system according to the principles of the subject invention.

In FIG. 5, the A/V system 40 is depicted having various modifications over the embodiment of FIG. 4. In particular, the A/V signal receiver 42 includes a 2-input to 1-input (2-1 or 2 to 1) component 82 instead of the switch 62 (see FIG. 4). The 2-input to 1-input component 82 is operative to allow whichever video signal appears on either one of the first video output line 47 and the second video output line 55.

In order to avoid signal confusion at the 2 to 1 component 82, the control signal source 84 is in communication with the first video signal processor 46 via a first control line 90, and in communication with the second video signal processor 92 via a second control line 94. The first video signal processor 46 includes an output enable/disable (Output En/Dis) input 88, while the second video signal processor 54 includes an output enable/disable (Output En/Dis) input 92. The first output enable/disable input 88 is operative to enable or disable output to the first video output 47 in accordance with a received signal or signals. In particular, the first output enable/disable input 88 is operative when a proper control signal is received via the first control line 90 from the control signal source 84 to select, allow, or enable the first video output 47. Enabling the first video output 47 allows the first video signal to be provided to the 2 to 1 component 82 that thereafter provides the first video signal to the video output 64. The first enable/disable input 88 is operative, on the other hand, when a proper control signal is received via the first control line 90 from the control signal source 84 (or the de-application of the enable signal) to de-select or disable the output of the first video signal via the first video output 47.

In like manner, the second output enable/disable input 92 is operative when a proper control is operative when a proper control signal is received via the second control line 94 from the control signal source 84 to select, allow, or enable the second video output 55. Enabling the second video output 55 allows the second video signal to be provided to the 2 to 1 component 82 that thereafter provides the second video signal to the video output 64. The second enable/disable input 92 is operative, on the other hand, when a proper control signal is received via the second control line 94 from the control signal source 84 (or the de-application of the enable signal) to de-select or disable the output of the second video signal via the second video output 55.

When one video signal (i.e. either the first or second video signal) is selected/enabled, the other video signal (or output of the video signal processor) is disabled. In this manner, only one video signal is provided to the 2 to 1 component 82 for output to the video output 64.

Figure 6:
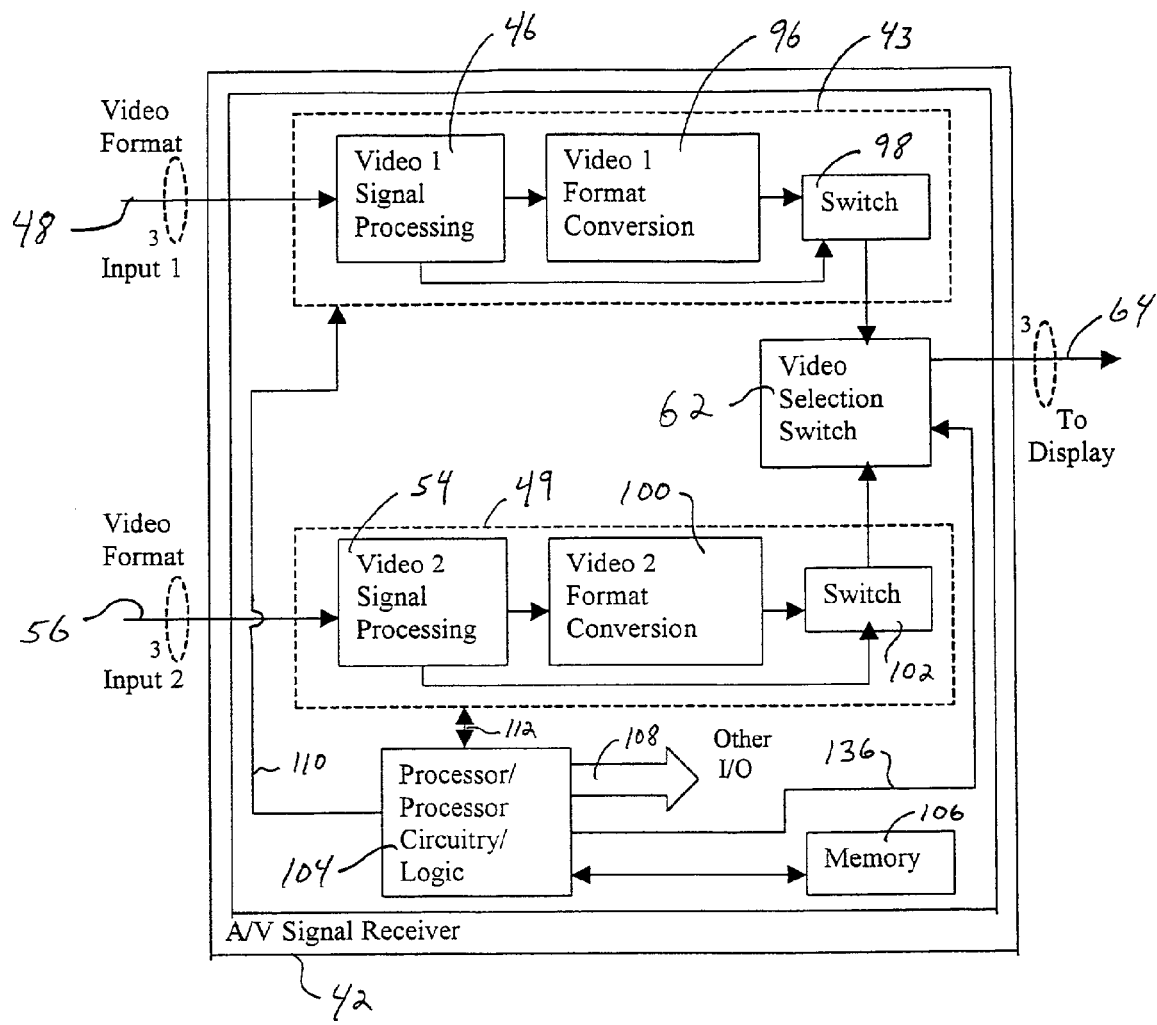
FIG. 6 is a block diagram of an exemplary audio/video signal receiver utilizable in the various exemplary audio/video systems according to the principles of the subject invention.

Referring now to FIG. 6, an alternative embodiment of the A/V signal receiver 42 is shown in accordance with the principles of the subject invention. The A/V signal receiver of FIG. 6 includes two video inputs 48 and 56 each of which accepts video signals of various video formats. In particular, each video input is operative to receive video signals irrespective of the video signal format. More particularly, each video input processes an input video signal, performs any necessary video format conversion, and outputs either the original incoming video signal, depending on its video format, or the format converted video signal. The A/V signal receiver 42 is operative to provide as an output video signal either one of the two input video signals from the two video inputs. It should be appreciated that each video input has only one component coupled thereto that provides video signals of a particular video format (without the use of an external switch or other component coupling device).

The A/V signal receiver 42 includes a first video processing unit or processor 43 for first video signals provided (input) to the first video input 48, and a second video processing unit or processor 49 for second video signals provided (input) to the second video input 56. The first video processing unit 43 is operative to receive the first video signal, process and/or condition the first video signal, perform any necessary video format conversion, and provide a first video signal for use by the A/V signal receiver 42 and/or selection as a video output of the A/V signal receiver 42. The second video processing unit 49 is operative to receive the second video signal, process and/or condition the second video signal, perform any necessary video format conversion, and provide a second video signal for use by the A/V signal receiver 42 and/or selection as a video output of the A/V signal receiver 42.

The first video processor 43 includes the video signal processing circuitry/logic (processor) 46, a video format converter 96, and a selector or switch 98. The video signal processor 46 (video 1 signal processing) processes the various component video format signals, such as RGB and YUV, and provides two video outputs. The particular video format signal that is provided to the two video outputs is dependent upon the desired video format of the output video signal of the A/V signal receiver 42. An input video signal undergoes format conversion when the video format of that input video signal is not compatible with the desired video format of the output video signal of the A/V signal receiver. This could be an RGB or YUV component.

The first video output of the video 1 signal processing 46 is provided to the video 1 format converter 96 to convert the video format into a video format compatible with the desired video format of the output video signal of the first video processor 43. The format converted video signal is then provided as an input to the switch 98. The second video output of the video 1 signal processing 46 is provided directly to the switch 98.

The A/V signal receiver 42 also includes a processor or processing circuitry/logic 104. The processor 104 is in communication with memory 106. The memory 106 contains program instructions for controlling and/or regulating various functions of the A/V signal processor 42 in general, and the various components of the A/V signal receiver 42, including the processor 104. The processor 104 is in communication with the various components of the A/V signal receiver 42 and its inputs and outputs (I/O), as represented by the arrow 108.

The processor 104, thus generally under the control of program instructions stored in the memory 106, provides control signals to the first video processor 43. The control signals from the processor 104 control the switch 98 to select a video signal of a particular video format (either the pass-through video signal or the format-converted video signal). The selection may be automatic depending on a determination of the video format of the incoming video signal by the video 1 signal processing 46. Further, this selection may be provided as a set-up feature that determines system configuration. This may be provided as an on-screen display format for user interaction and/or be settable at any time via other means. In any case, the video output of the switch 98 is provided as an input to the video selection switch 62 (the selector for the main video output signal for the A/V signal receiver).

The second video processor 49 includes the video signal processing circuitry/logic (processor) 54, a video format converter 100, and a selector or switch 102. The video signal processor 54 (video 2 signal processing) processes the various component video format signals, such as RGB and YUV, and provides two video outputs. The particular video format signal that is provided to the two video outputs is dependent upon the desired video format of the output video signal of the A/V signal receiver 42. An input video signal undergoes format conversion when the video format of that input video signal is not compatible with the desired video format of the output video signal of the A/V signal receiver. This could be an RGB or YUV component.

The second video output of the video 2 signal processing 54 is provided to the video 2 format converter 100 to convert the video format into a video format compatible with the desired video format of the output video signal of the second video processor 49. The format converted video signal is then provided as an input to the switch 102. The second video output of the video 2 signal processing 54 is provided directly to the switch 102.

In like manner to the above with respect to the first video processor 43, the processor 104 provides control signals to the second video processor 49. The control signals from the processor 104 control the switch 102 to select a video signal of a particular video format (either the pass-through video signal or the format-converted video signal). The selection may be automatic depending on a determination of the video format of the incoming video signal by the video 2 signal processing 54. Further, this selection may be provided as a set-up feature that determines system configuration. This may be provided as an on-screen display format for user interaction and/or be settable at any time via other means. In any case, the video output of the switch 102 is provided as an input to the video selection switch 62 (the selector for the main video output signal for the A/V signal receiver).

It should be appreciated that alternative to a switch in the first and second video processors 43 and 49, the processor 104 may provide control signals to the respective video signal processor and video format converter in each video processor, to enable or disable their respective video output line (i.e. provide or not provide the video signal as an output thereof) as an output of the respective video signal processor 43 and 49.

The video selection switch or selector 62 receives the outputs of the first video processor 43 (providing a first video signal) and the second video processor 49 (providing a second video signal). The video format of the two video signals is compatible with the display or other output device or component. The video selection switch 62 is operative to allow one of the two video signals to be provided as A/V video out to the video output 64. Thus, the switch 62 provides one of the two input signals to the two inputs 48 and 56 as a selected video signal with the video format compatible with the output device.

The switch 62 is in communication with the processor 104 via a control line 136. The processor 104 provides control signals via the control line 136 for switch operation. Selection of which video signal to use (e.g. send to a display for viewing thereof) is typically under ultimate control by a user via a remote control system (not shown) and/or via an on-screen menu or selector. The processor 014 may automatically provide the control signals to the selector 62 depending on the program instructions.

Figure 7:
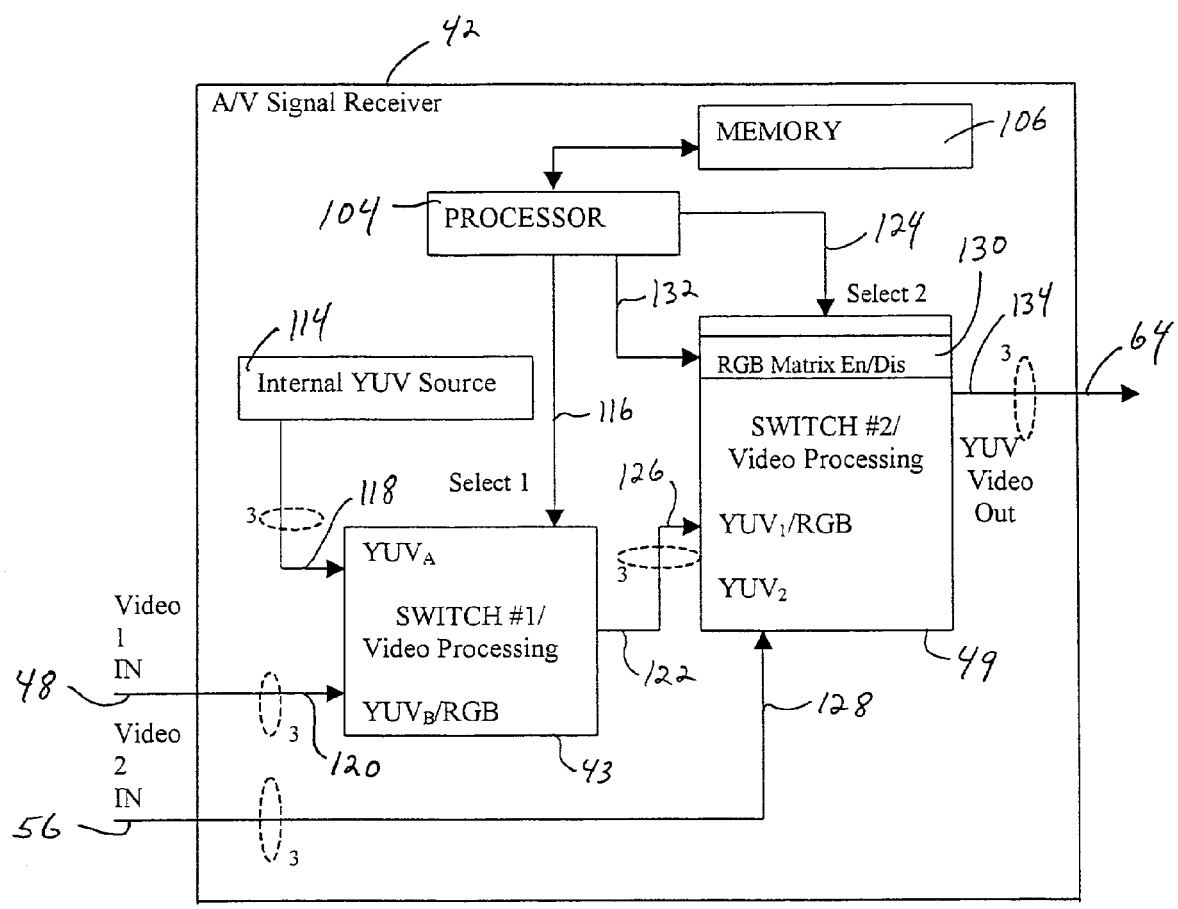
FIG. 7 is a block diagram of another exemplary audio/video signal receiver utilizable in the various exemplary audio/video systems according to the principles of the subject invention.

Referring now to FIG. 7, there is depicted a particular embodiment of the A/V signal receiver 42. In this embodiment, the first video processor 43 comprises a first switch/video processing (Switch #1), while the second video processor 49 comprises a second switch/video processing (Switch #2). In this embodiment, the first switch/video processing 43 is constrained to accept a video signal from the video 1 IN (video input 48) of a particular video format that is compatible with the video format used by any output device coupled to the video output 64 of the A/V signal receiver 42, since the first switch/video processing 43 does not include format conversion. The second switch/video processing 49 is not constrained in video format input as is the first switch/video processing 43.

The first switch/video processing 43 has a first video signal input $YUV_A$ and a second video signal input $YUV_B$/RGB. The first video signal input $YUV_A$ accepts a YUV video format signal from an internal YUV source 114. The internal YUV source 114 provides a 2.xxH component video signal. The second video signal input $YUV_B$/RGB accepts a video signal of any video format (e.g. YUV or RGB) from the Video 1 In external video input 48. The first switch/video processing 43 provides either the video signal from the $YUV_A$ input or the $YUV_B$/RGB input. Selection of a first output video signal from the first switch/video processing 43 is under control of the processor 104 via a control signal provided thereto via the control line 116.

The second switch/video processing 49 has a first video signal input $YUV_1$/RGB and a second video signal input $YUV_2$. The first video signal input $YUV_1$/RGB accepts as an input video signal the output video signal of the first switch/video processing 43 which may be the $YUV_A$ video signal or either a $YUV_B$ or RGB video signal. The second video input $YUV_2$ accepts an input video signal from the Video 2 IN video input 56. The input video signal at the Video 2 IN video input 56 is in the YUV video format and thus is provided from a YUV component or source. Preferably, the external YUV source for the video input 56 provides a 2H or 2.14 H component video signal. This may be provided by a multi-sync component, computer, set-top box, or the like. The second switch/video processing 49 provides either the video signal from the $YUV_2$ input or the $YUV_1$/RGB input. Selection of a second output video signal from the second switch/video processing 49 is under control of the processor 104 via a control signal provided thereto via the control line 124.

When a selection signal is received by the second switch/video processing 49 from the processor 104 via the selection line 124, the second switch/video processing 49 outputs either the video signal from the $YUV_2$ input or the $YUV_1$/RGB input as an output video signal 134 on the video output 64. When the $YUV_2$ input video signal is selected (or the video signal that is compatible with any output device or component), it is provided as a pass-through output video signal 134. When the $YUV_1$/RGB input video signal is selected it is determined whether the video format is YUV or RGB. If the video format is YUV, the YUV input video signal is provided as a pass-through output video signal 134. If the video format is RGB, RGB to YUV video format conversion is performed by the second switch/video processing 49. Video format conversion is preferably accomplished via matrixing. To this end the processor 104 provides a matrix enable/disable signal via the control line 132 to the RGB matrix enable/disable (En/Dis) input 130. When an enable signal is received by the RGB matrix enable/disable input 130, the RGB video signals on input YUV$_1$/RGB are converted into YUV format video signals and provided as the video output 64. When a disable signal is received by the RGB matrix enable/disable input 130, video format conversion is disabled.

Figure 8:
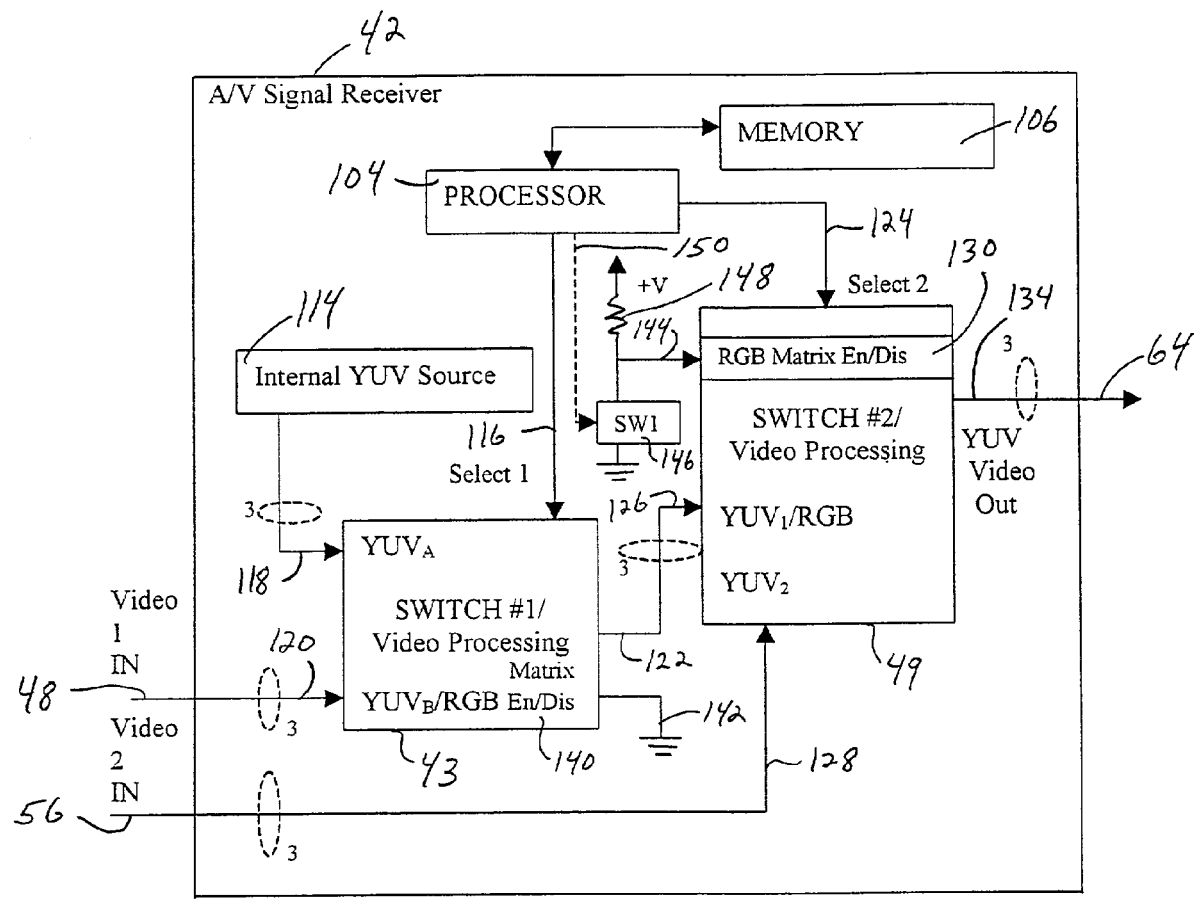
FIG. 8 is a block diagram of another exemplary audio/video signal receiver utilizable in the various audio/video systems according to the principles of the subject invention.

Referring to FIG. 8, there is depicted a modification to the particular embodiment of the A/V signal receiver 42 as shown in FIG. 7. Particularly, the first and second switches/video processors 43 and 49 are preferably the same component, namely an integrated circuit (I/C) such as a TA1287 YUV/RGB processor video format converter manufactured by Toshiba Semiconductor. The TA1287 accepts two video inputs and outputs a selected one of the two video inputs. Video format conversion is provided to an input signal as necessary. Particularly, the TA1287 provides RGB to YUV conversion while accepting both YUV and RGB video input signals.

Thus, the first switch/video processing 43 is shown having an RGB matrix enable/disable input 140. The RGB matrix enable/disable input 140 is disabled as represented by providing a low or logic "0" signal via grounding 142. In this manner, the first switch/video processing 43 passes any selected input signal regardless of the video format to the second switch/video processing 49.

The RGB matrix enable/disable input 130 of the second switch/video processing 49 is provided a high (logic "1") or enable signal, or a low (logic "0") or disable signal as appropriate for a selected video input signal via a switch (SW1) 146. The switch 146 when open is coupled to a voltage from a voltage source +V via an appropriate resistance 148 to provide the high or logic "1" signal (enable) for the matrix enable/disable input 130. When the switch 146 is closed, a low or logic "0" signal (disable) is provided to the matrix enable/disable input. The switch 146 may or may not be controlled by a control signal from the processor 104 via control line 105.

Thus, the second switch/video processing 49 regardless of the input video format, provides an output video format signal that is YUV (either original YUV or matrixed RGB). The output YUV video format signal is then provided to a YUV component.

In this manner, the A/V signal receiver 42 has two external inputs one of which is configured to accept only YUV video format components or signal inputs, while the other of which is configured to accept both YUV and RGB video format signals.

Figure 9:
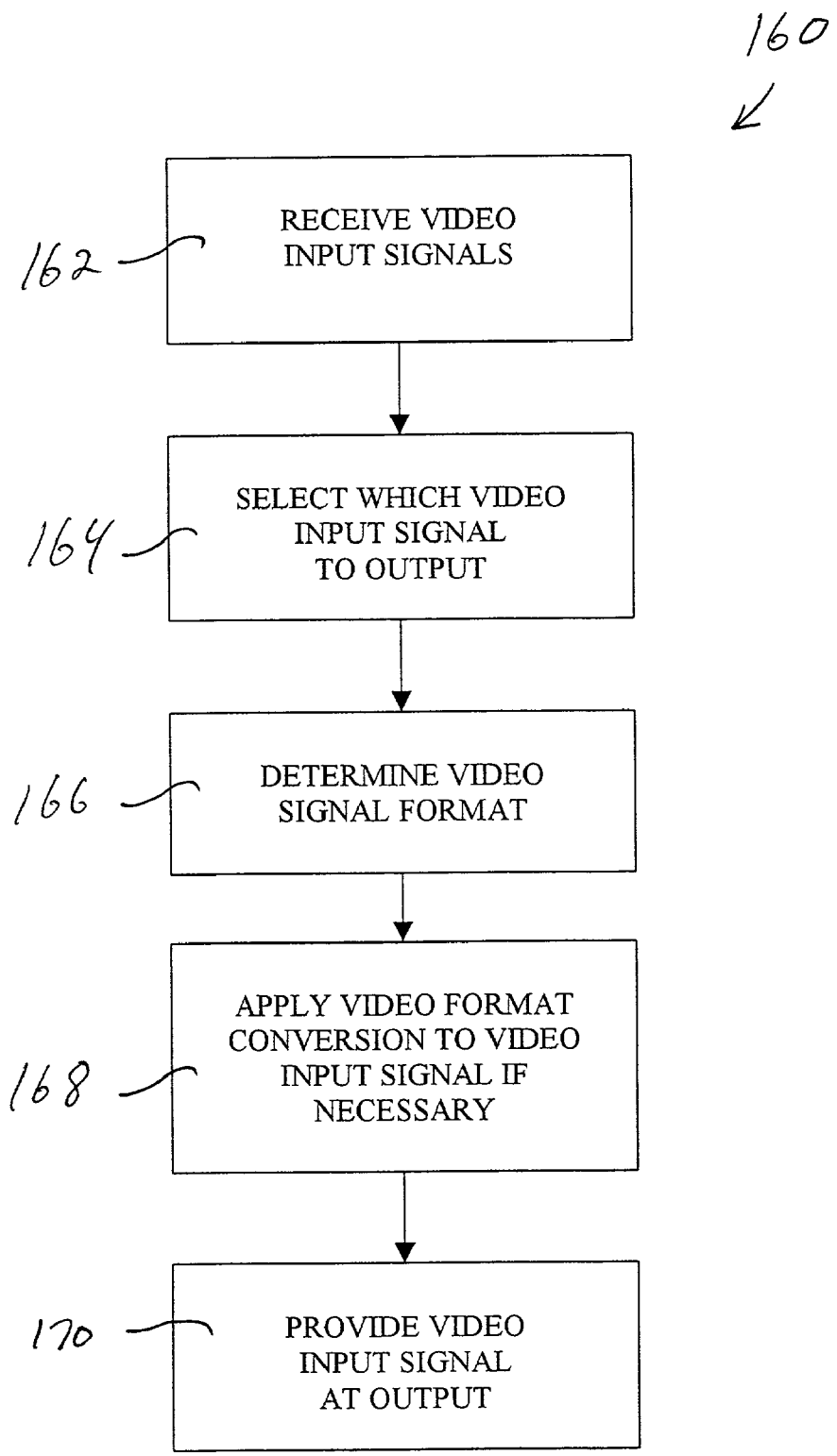
FIG. 9 is a flow chart of an exemplary manner of operation of the exemplary embodiments of FIGS. 1-8 in accordance with the principles of the subject invention.

Referring to FIG. 9, there is depicted a flow chart, generally designated 160, illustrating an exemplary manner of operation of the various embodiments of the subject invention. In step 162, the A/V signal receiver receives a video signal or video signals depending on the number of external video inputs. The A/V signal receiver then selects, in step 164, which video input signal to eventually output. Selection of which video signal to use is typically accomplished by a user via a remote control system associated with the A/V signal receiver. Such selection is typically provided to the processor of the A/V signal receiver. The processor then sends a control signal to the appropriate circuitry/logic to make the selection.

In step 166, it is determined whether the selected video signal requires video format conversion. Video format conversion of the selected video signal is necessary if the video format of the selected video signal is not compatible with the video format utilized by an external video component that is to receive the output video signal. In step 168, if it is determined that the selected video signal requires video format conversion, then video format conversion is performed on the selected video signal. For example, if the external video component that is to receive the output video signal requires the YUV video format, a selected video signal that is in the RGB video format needs to undergo video format conversion, and vice versa. In step 170, after any video format conversion, the video signal is provided as an output video signal of the A/V signal receiver.

It should be appreciated that various aspects of the subject invention have been presented within various embodiments of the A/V signal system and/or the A/V signal receiver. Such depiction is not intended to limit various combinations of aspects whether or not they appear with each other in a particular embodiment (Figure). Therefore, various combinations of the aspects of the subject invention not particularly shown together in the Figures are contemplated.

It should further be appreciated that while the subject invention has been described in connection with an audio/video device, the subject invention pertains mainly to video signals. Therefore, the subject invention is operative and contemplated for use in video only devices that do not process or accept audio. The video only device may thus accept video signals of different video formats via a single set of component video inputs.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and which fall within the limits of the appended claims.

Modern Television monitors must be able to display a wide variety of signal formats because of all the conversions from analog to digital signal sources. Two signal sources, RGB (Red, Green and Blue) and YUV are used quite often and even though of different formats can be connected through special cables to the same type (VGA) of signal connector. The RGB formatted signal has separate Horizontal and Vertical Synchronization signals where the YPrPb has the Horizontal (H) and Vertical (V) synchronization (sync) embedded on the Green (G) signal. If the RGB source is applied, then the separate H sync and V sync will have format timing information that can be measured to determine the signal format. In this case the Television Display device will route the RGB signals and H sync and V sync through appropriate video and sync processing to display a correctly formatted raster. For the YPrPb signal sources the H sync and V sync lines will have no format timing information and the Television Display device will derive the H Sync and V Sync timing information from the Green signal (Y). These internally created H Sync and V Sync signals along with the video information derived from the YUV lines is used to provide a correctly formatted raster.

What is claimed is:

1. In a video signal receiver having first and second component video signal inputs, a method of processing input video signals comprising the steps of:

generating an internal component video signal in a particular format;

receiving first and second video signals via the respective first and second component video signal inputs, each received video signal having a video format that is one of multiple video formats;

processing the received first and second video signals;

selecting, in the first stage, one of the internal component video signal and the processed first video signal;

converting the video format of the selected video signal from the first stage selecting step to the particular video format if the video format of the selected video signal from the first stage selecting step is different from the particular video format;

selecting, in the second stage, one of the converted video signal and the processed second video signal; and providing the selected video signal from the second stage selecting step as an output.

2. The method of claim 1, wherein the processing step comprises the step of:

determining the video format of the first video signal before the converting step.

3. The method of claim 1, wherein the one of multiple video formats is one of RGB and YUV video formats.

4. The method of claim 1, wherein the particular video format is a YUV video format.

5. The method of claim 1, wherein the output is an output of the video signal receiver.

6. The method of claim 1, wherein the converting step includes the step of utilizing a video format matrix converter.

7. The method of claim 6, wherein the step of utilizing a video format video converter includes the step of utilizing a video format matrix converter that is operative to convert an RGB video format signal into a YUV video format converter.

8. The method of claim 1, further comprising the step of converting the video format of the processed first video signal into the particular format, if the processed first video signal is not in the particular format, and the first stage selecting step selects one of the converted processed first signal and the internal component video signal.

9. A video signal receiver generating an internal component video signal in a predetermined format, said video signal receiver comprising:

first and second component video format inputs operative to receive respective first and second component video signals, each signal in one of various video formats;

first and second video processors in communication with said respective first and second component video format inputs and operative to provide video processing of the respective first and second received component video signals;

a first switch in communication with said first video processor and operative to select one of the internal component video signal and the processed first component video signal;

a first format converter in communication with said first video processor and operative to convert the video format of the selected video signal from the first switch to the predetermined video format if the video format of the selected video signal from the first switch is different from the predetermined video format;

a second switch in communication with said second video processor and operative to select one of the processed second component video signal and the converted video signal; and a component video format output in communication with said second video processor and said first format converter and operative to output the selected component video signal from the second switch.

10. The video signal receiver of claim 9, wherein said various video formats include an RGB video format and a YUV video format.

11. The video signal receiver of claim 10, wherein the predetermined video format is YUV and said first format converter comprises an RGB to YUV video format matrix converter.

12. The video signal receiver of claim 9, further comprising a second format converter in communication with the first video processor and operative to convert the video format of the processed first video signal to the predetermined video format, wherein the first switch selects one of the converted processed first video signal and the internal component video signal.

13. The video signal receiver of claim 9, further comprising a processor in communication with said first and second switches, said processor operative to provide switch control signals to said first and second switches.

14. The video signal receiver of claim 13, wherein said second video processor is further operative to determine if the video format of the selected video signal from the first switch is the same as the predetermined video format.

15. The video signal receiver of claim 14, wherein the second video processor is further operative to provide a control signal to said processor to provide the control signal to said second switch.

16. A video signal receiver generating an internal component video signal in a predetermined format, said video signal receiver comprising:

first and second component video inputs operative to receive respective first and second component video signals, each signal in one of multiple video formats;

first and second means for processing the respective first and second received video signals;

a first switch in communication with said first processing means and operative to select one of the internal component video signal and the processed first received video signal;

first means for converting the video format of the selected video signal from the first switch into the predetermined video format if the video format of the selected video signal from the first switch is different from the predetermined video format;

a second switch in communication with said second processing means and operative to select one of the processed second component video signal and the converted video signal; and means for providing the selected video signal from the second processing means an output of the video signal receiver.

17. The video signal receiver of claim 16, further comprising:

means for determining the video format of the selected video signal from the first switch; and means operative in response to said means for determining the video format of the selected video signal from the first switch to enable conversion of the video format of the selected video signal from the first switch.

18. The video signal receiver of claim 16, wherein the predetermined video format is YUV.

19. The video signal receiver of claim 18, wherein the multiple video formats includes RGB and YUV.

20. The video signal receiver of claim 16, further comprising a second means for converting the video format of the processed first component video signal into the predetermined format, and the first switch selects one of the converted processed first component video signal and the internal component video signal.

* * * * *